(12) United States Patent
LaBlanc et al.

(10) Patent No.: US 6,675,127 B2
(45) Date of Patent: Jan. 6, 2004

(54) COMPUTERIZED SYSTEMS AND METHODS FOR MANAGING PROJECT ISSUES AND RISKS

(75) Inventors: Michael Robert LaBlanc, Wilton, NY (US); Mark Mitchell Kornfein, Latham, NY (US); Vrinda Rajiv, Guilderland, NY (US); Jeffrey Paul Norris, Niskayuna, NY (US); Tony Chishao Pan, Niskayuna, NY (US); Hui Gao, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 65 days.

(21) Appl. No.: 09/882,689

(22) Filed: Jun. 15, 2001

(65) Prior Publication Data

US 2002/0193965 A1 Dec. 19, 2002

(51) Int. Cl.$^7$ ............................................. G06F 101/14
(52) U.S. Cl. ........................... 702/181; 702/179; 705/1; 705/7; 706/47
(58) Field of Search .................................. 702/181, 179; 705/1, 7; 706/47

(56) References Cited

U.S. PATENT DOCUMENTS 6,397,202 B1 * 5/2002 Higgins et al. ............... 706/47
6,404,807 B1 * 6/2002 Mehrabanzad et al. ..... 370/465
6,427,032 B1 * 7/2002 Irons et al. .................. 382/306

* cited by examiner

Primary Examiner—John Barlow
Assistant Examiner—Meagan S. Walling
(74) Attorney, Agent, or Firm—Christopher L. Bernard, PLLC

(57) ABSTRACT

Computerized systems and methods for managing the issues and risks associated with a project including an issue management module operable for creating, storing, and searching a plurality of issues, a risk management module operable for creating, storing, and searching a plurality of risks, a processor operable for manipulating information related to the plurality of issues and risks, and a communications network operable for communicating information related to the plurality of issues and risks to and from a plurality of remote users simultaneously.

39 Claims, 4 Drawing Sheets

COMPUTERIZED SYSTEMS AND METHODS FOR MANAGING PROJECT ISSUES AND RISKS

BACKGROUND OF THE INVENTION

The present invention relates generally to computerized systems and methods for assuring process compliance for a wide array of processes and, more specifically, to web-based systems and methods for managing the issues and risks associated with a project.

Businesses utilize a variety of processes in their day-to-day operations. These processes may involve the completion of a number of discrete steps, forming a project. For example, businesses may utilize a variety of processes for bringing new products to market, often collectively referred to as new product introduction (NPI) processes. NPI processes may involve, for example, initial product conception, product design, product manufacture, and post-shipment follow-up. Typically, such processes include a series of tollgates, or go/no-go points. Each tollgate may include a set of activities and each set of activities may include a set of tasks. Typically, such processes also include a series issues and risks which must be monitored, tracked, and addressed. While NPI processes are often very similar, they may be customized based upon the needs of a particular business or the requirements associated with a particular product. As a result, NPI processes may vary with respect to focus, steps, and nomenclature.

Traditionally, businesses have kept track of the steps comprising a project, and the life-cycles of the associated issues and risks, manually on paper or with the aid of locally-accessible computer programs, such as spreadsheets and project management applications. Such systems and methods, however, have several important limitations. Such systems and methods are not generic and new papers or spreadsheets must be generated, for example, each time a new product is introduced, or when a new business utilizes an existing process. Alternatively, when locally-accessible project management applications are used, information related to issues and risks must be transferred from user to user via a computer-readable medium, such as on a diskette. As a result, it is difficult to search a series of projects for a particular issue or risk. It is also difficult to search for and identify a project based upon a given issue or risk. Likewise, it is difficult for a remote user to monitor and track the status of a particular issue or risk within the context of a given project.

Thus, what is needed are globally-accessible, web-based systems and methods for managing the issues and risks associated with a project. What is needed are systems and methods which allow a remote user to create and store issues and risks associated with a project, search for and identify a project based upon a given issue or risk, and search a series of projects for a particular issue or risk. What is also needed are systems and methods which allow a remote user to monitor and track the status of a particular issue or risk within the context of a given project.

BRIEF DESCRIPTION OF THE INVENTION

The present invention overcomes the above limitations and provides systems and methods for managing the issues and risks associated with a project.

In one embodiment, a computerized method for managing the issues and risks associated with a project includes creating a plurality of issues and risks using a globally-accessible system, attaching meta-data to the plurality of issues and risks, searching and identifying the plurality of issues and risks using the meta-data, and monitoring and tracking the plurality of issues and risks using the globally-accessible system.

In another embodiment, a computerized system for managing the issues and risks associated with a project includes an issue management module operable for creating, storing, and searching a plurality of issues, a risk management module operable for creating, storing, and searching a plurality of risks, a processor operable for manipulating information related to the plurality of issues and risks, and a communications network operable for communicating information related to the plurality of issues and risks to and from a plurality of remote users.

DETAILED DESCRIPTION OF THE INVENTION

Figure 1:
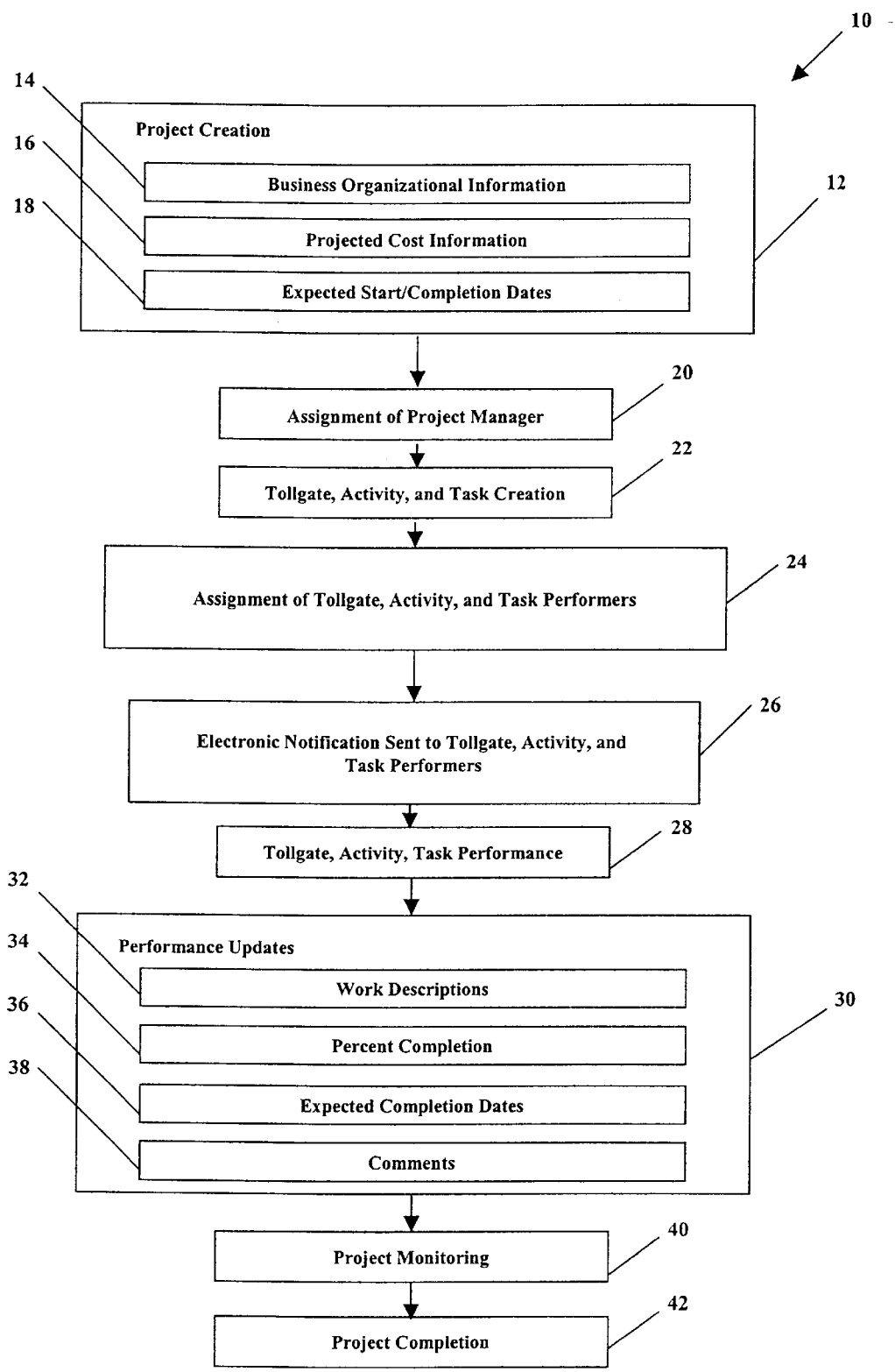
FIG. 1 is a flow chart of one embodiment of a computerized method for managing the issues and risks associated with a project.

Referring to FIG. 1, in one embodiment, a computerized method 10 for managing the issues and risks associated with a project allows a remote user to log into a globally-accessible system and create and store a plurality of issues and risks 12. The globally-accessible system preferably includes a web page which contains or is in communication with an issue management module and a risk management module. The web page is preferably secure and may include a plurality of dynamic menus, drop-down lists, links, and the like displayed on a graphical user interface. Through the web page, a project creator, a project leader, a project manager, a team member, an activity or task performer, or any other authorized remote user may view information, submit information, and query the system. After a set of issues and risks has been created and stored, the issue management module and the risk management module may attach meta-data to the various issues and risks 14. The meta-data may include information about the issues and risks. The meta-data allows the issues and risks to be searched and identified 16. For example, the meta-data may be used to search for an issue 18 among one or a plurality of projects, search for a risk 20 among one or a plurality of projects, or identify a project 22 based upon a given issue or risk. Once an issue or risk has been searched and identified 16, the status of the issue or risk may be monitored and tracked by a remote user 24. For example, the issue management module may allow the status of an issue to be tracked over its life-cycle, or over the life-cycle of a project 26. The risk management module may allow the status of a risk to be monitored using a Risk Probability Number (RPN) 28.

Figure 2:
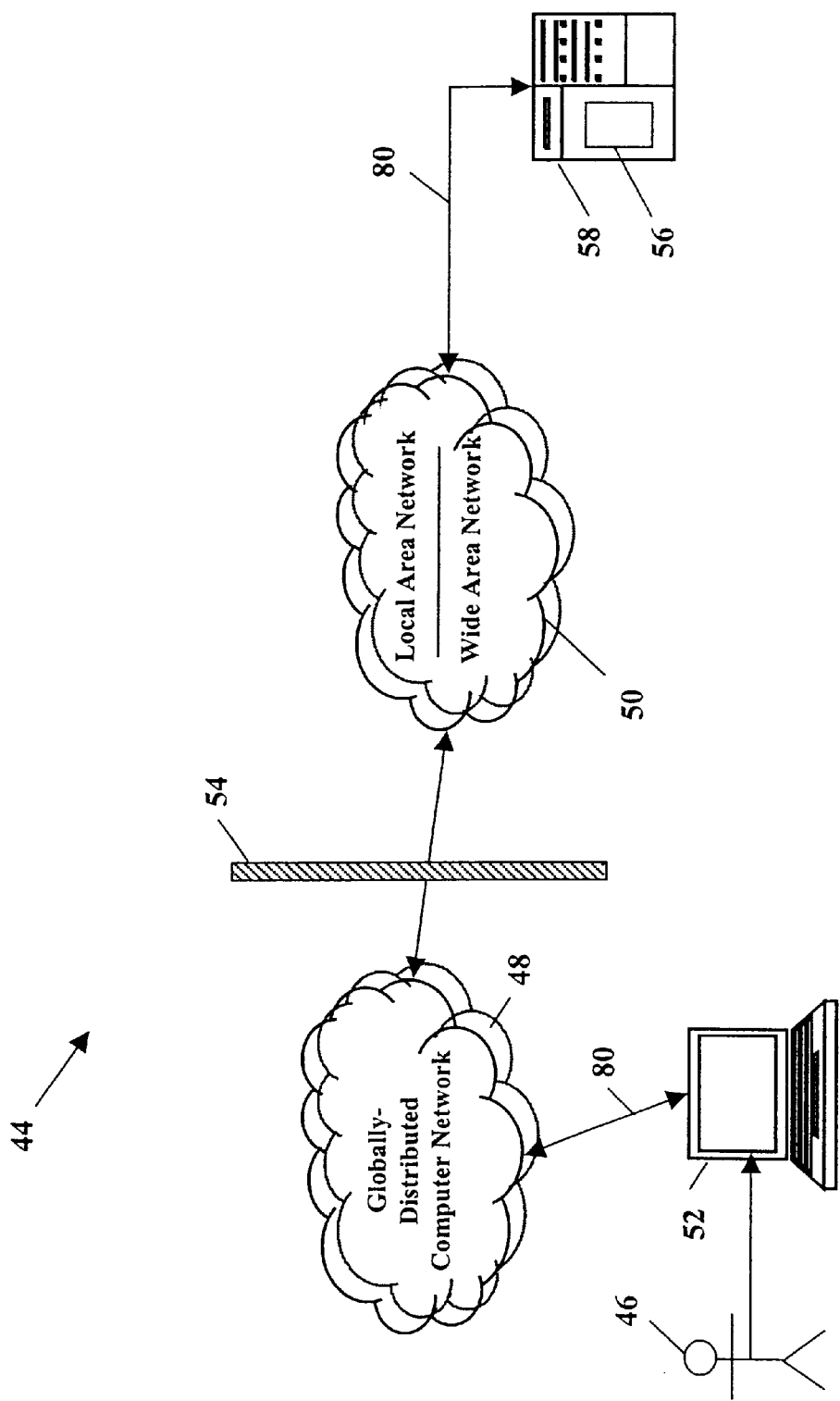
FIG. 2 is a schematic diagram of one embodiment of a computerized system for managing the issues and risks associated with a project.

Referring to FIG. 2, in one embodiment, a computerized system 30 for managing the issues and risks associated with a project includes a remote user 32 linked to an issue/risk management web page 34 via a globally-distributed computer network 36, such as the Internet or an intranet, and/or a local area network/wide area network (LAN/WAN) 38. This link may be established along one or more data communication lines 40, or via wireless interfaces. The remote user 32 may view, submit, and query information at the issue/risk management web page 34 through a browser application run by a computer 42, such as a desktop or laptop personal computer. Through the issue/risk management web page 34, the remote user 32 is linked, through a firewall 44, to an issue management module 46 and a risk management module 48 which operate on project-related data. The issue/risk management web page 34 may reside in a persistent storage device 50, such as an application server, a web server, a file server, or a database server. The system 30 is set up such that the server 50 may communicate information to and acquire information from a plurality of remote users 32 simultaneously.

Figure 3:
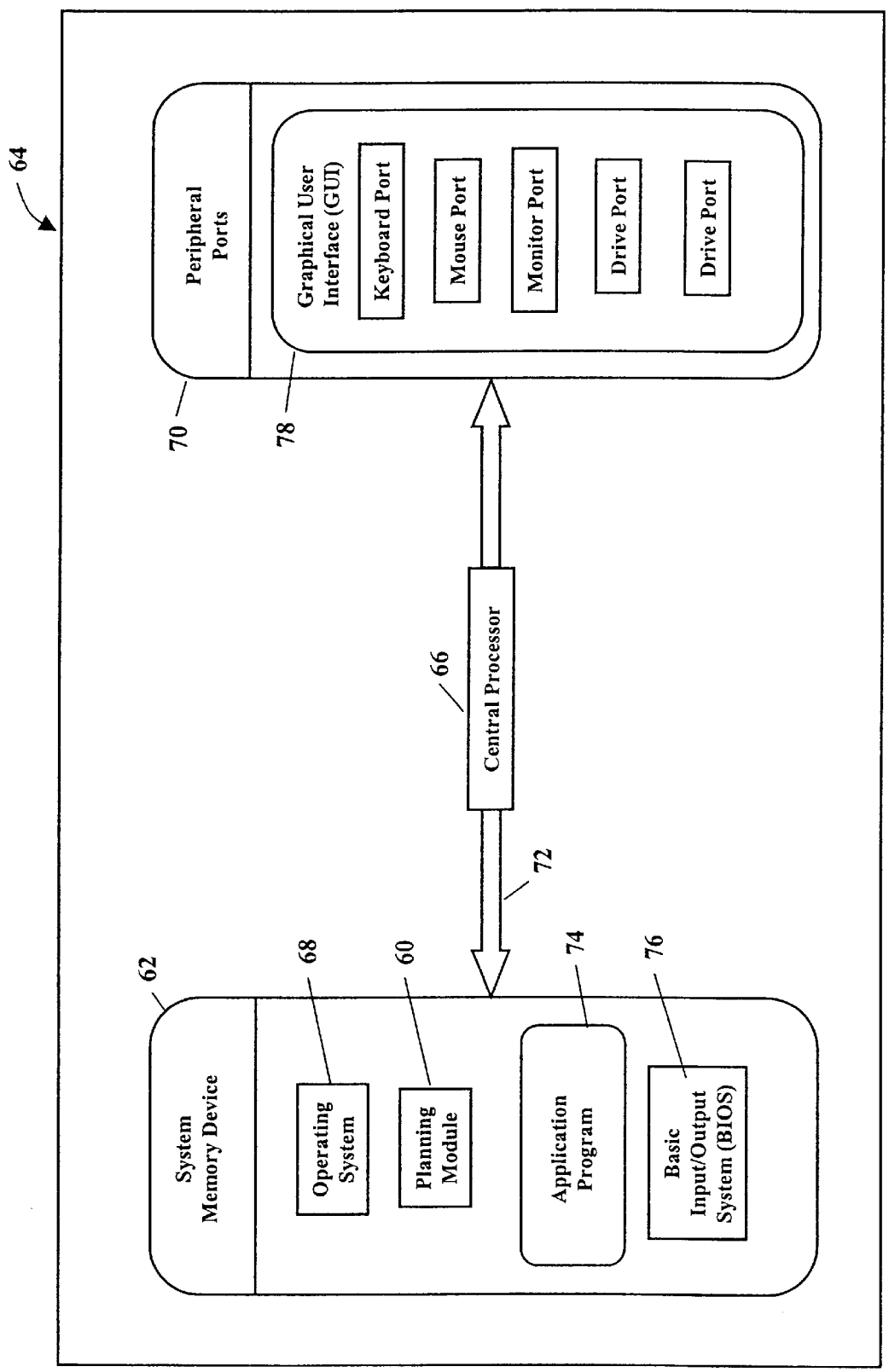
FIG. 3 is a functional block diagram of one embodiment of a computer system comprising the system for managing the issues and risks associated with a project.

Referring to FIG. 3, in one embodiment, the issue management module 46 and risk management module 48 comprise one or more computer programs which acquire project-related data, store and archive the data, manipulate the data, and formulate outputs which may be viewed and queried by the remote user 32 (FIG. 2). The issue management module 46 and risk management module 48 preferably reside within the system memory device 52 of a computer system 54, which may, optionally, be an application server, a web server, a file server, or a database server. The system memory device 52 may include a random-access memory (RAM) and a read-only memory (ROM). The system memory device 52 may also include other types of memory, such as programmable read-only memory (PROM), erasable programmable read-only memory (EPROM), and electrically erasable programmable read-only memory (EEPROM). The system memory device 52 also preferably includes an operating system 56 that executes on a central processor 58. The central processor 58 may be, for example, a microprocessor. Suitable examples of microprocessors include, but are not limited to, those manufactured by Advanced Micro Devices, Inc. (Sunnyvale, Calif.), Intel Corporation (Santa Clara, Calif.), Motorola, Inc. (Schaumburg, Ill.), International Business Machines Corp. (Armonk, N.Y.), and Transmeta Corp. (Santa Clara, Calif.). The central processor 58 may include an arithmetic logic unit (ALU), which performs arithmetic and logic operations, and a control unit, which extracts instructions from the system memory device 52. The operating system 56 may include a set of instructions which control the internal functions of the computer system 54. For example, the operating system 56 may recognize input from input devices, send output to output devices, keep track of directories and files, and control various peripheral devices. Suitable examples of operating systems 56 include, but are not limited to, those manufactured by Microsoft Corporation (Redmond, Wash.), Apple Computer, Inc. (Cupertino, Calif.), and Sun Microsystems, Inc. (Palo Alto, Calif). A system bus 60 may communicate signals, such as address signals, data signals, and control signals, between the system memory device 52, the central processor 58, and one or more peripheral ports 62. The system memory device 52 may also contain an application program 64 and a basic input/output system (BIOS) 66. The application program 64 cooperates with the operating system 56 and the one or more peripheral ports 62 to provide a graphical user interface (GUI) 68. The GUI 68 typically includes a combination of signals communicated along a keyboard port 70, a mouse port 72, a monitor port 74, and one or more drive ports 76. The BIOS 66 may interpret requests from the operating system 56 and interface with such ports to execute the requests. Accordingly, suitable input/output devices include a keyboard, a mouse, a monitor, a printer, a plotter, speakers, etc.

The systems, methods, programs, and processes described in relation to the present invention are not limited to any particular computer system. The computer system 54 may be a single device, or it may be a plurality of devices working in concert. The computer system 54 may take the form of a hand-held digital computer, a personal computer, a workstation, a server, a mainframe computer, and a super-computer.

Figure 4:
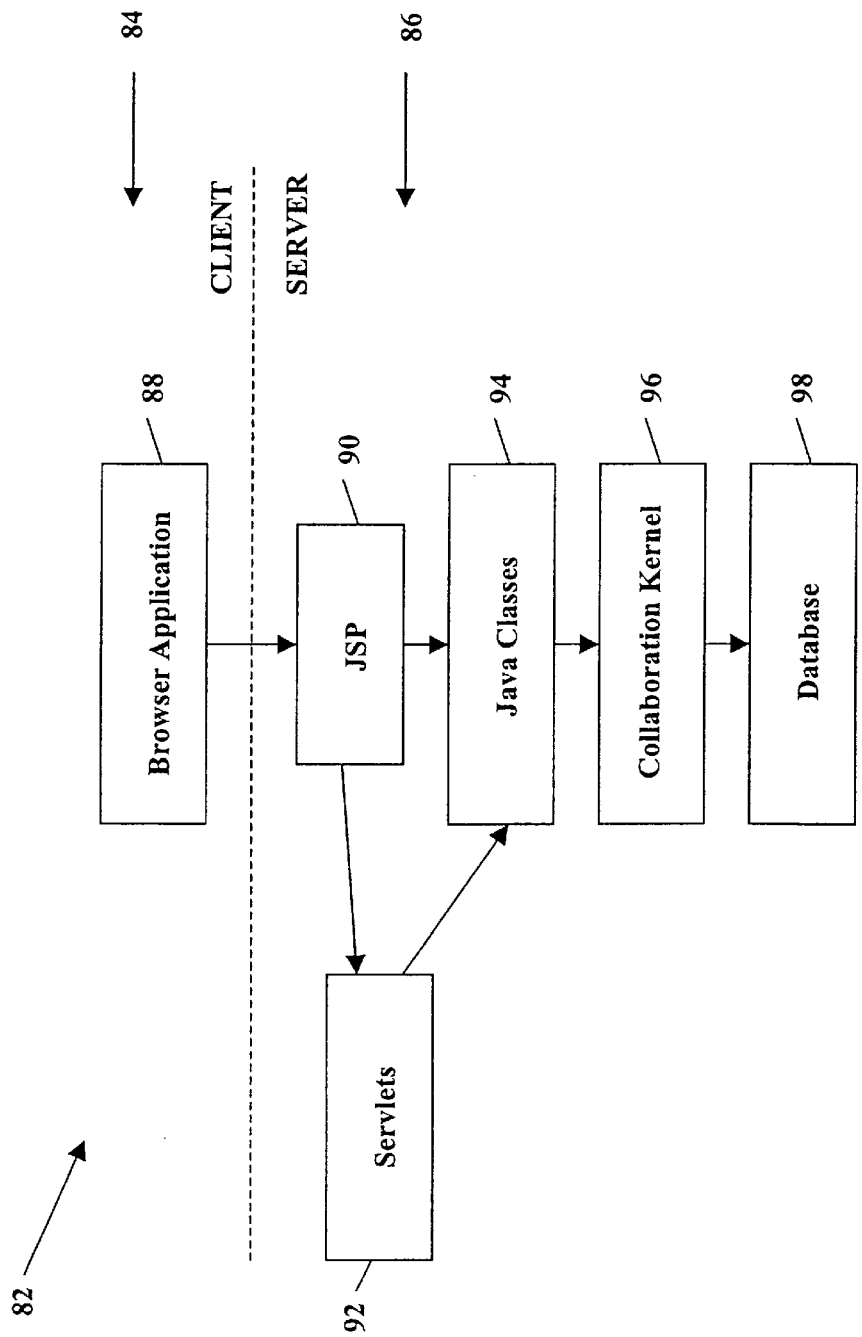
FIG. 4 is a functional block diagram of one embodiment of a system architecture for the system for managing the issues and risks associated with a project.

Referring to FIG. 4, in one embodiment, a system architecture 78 for the computerized system 30 (FIG. 2) for managing the issues and risks associated with a project includes a remote user/client portion 80 in communication with a server portion 82. The client portion 80 may include a browser application 84, such as a Hypertext Markup Language (HTML) or Extensible Markup Language (XML) browser. The computerized system 30 is preferably set up such that web pages have limited graphics content, allowing remote users 32 (FIG. 2) connecting via dial-up modems or the like to download the pages rapidly. The speed of the system 30 may also be increased by caching large files, such as by storing cached data in a cache server. The server portion 82 allows project-related data, including issues and risks, to be published through applications such as active server pages (ASPs), Java server pages (JSPs) 86, and applets, such as Java applets and servlets 88. Further, the server portion 82 may include one or more Java classes 90 and a collaboration kernel 92. The collaboration kernel 92 interfaces the Java classes 90 or Java application with a relational database 94 for persistent storage. Finally, the system 30 is set up such that it may communicate with external scheduling, planning, project management, and database software/applications.

As discussed above, functionally the computerized system 30 (FIG. 2) for managing the issues and risks associated with a project allows a remote user 32 (FIG. 2) to log into a globally-accessible system 30 and create and store a plurality of issues and risks. The globally-accessible system 30 preferably includes a web page 34 (FIG. 2) which contains or is in communication with an issue management module 46 (FIG. 2) and a risk management module 48 (FIG. 2). The web page 34 is preferably secure and may include a plurality of dynamic menus, drop-down lists, links, and the like displayed on a graphical user interface 68 (FIG. 3). Through the web page 34, a project creator, a project leader, a project manager, a team member, an activity or task performer, or any other authorized remote user 32 may view information, submit information, and query the system 30. After a set of issues and risks has been created and stored, the issue management module 46 and the risk management module 48 are operable for attaching meta-data to the various issues and risks. The meta-data allows the issues and risks to be searched and identified. For example, the meta-data may be used to search for an issue among one or a plurality of projects, search for a risk among one or a plurality of projects, or identify a project based upon a given issue or risk. Once an issue or risk has been searched and identified, the status of the issue or risk may be monitored and tracked by a remote user 32. For example, the issue management module 46 may allow the status of an issue to be tracked over its life-cycle, or over the life-cycle of a project. The risk management module 48 may allow the status of a risk to be monitored using a Risk Probability Number (RPN). In any case, the system 30 may display project-related information with the aid of color-coded scorecards, bar charts, pie charts, line graphs, and other similar visual aids. The system 30 also allows a plurality of remote users 32 to simultaneously access, view, and update project-related information.

It is apparent that there has been provided, in accordance with embodiments of the present invention, web-based systems and methods for managing the issues and risks associated with a project. While the present invention has been particularly shown and described in conjunction with preferred embodiments thereof, it will be appreciated that variations in and modifications to the present invention may be effected by persons of ordinary skill in the art without departing from the spirit or scope of the present invention. For example, the computerized systems and methods of the present invention may be used for assuring process compliance for a wide array of processes, not simply those related to new product introductions. Further, it is to be understood that the principles described herein apply in a similar manner, where applicable, to all preferred embodiments.

What is claimed is:

1. A computerized method for managing the issues and risks associated with one or more projects, the method comprising:

creating a plurality of issues and risks associated with one or more projects using a globally-accessible system;

attaching meta-data to the plurality of issues and risks associated with the one or more projects;

searching and identifying at least one of the plurality of issues and risks associated with the one or more projects using the meta-data, wherein searching and identifying at least one of the plurality of issues and risks associated with the one or more projects comprises determining the existence of the at least one of the plurality of issues and risks in the context of each of the one or more projects;

monitoring and tracking at least one of the plurality of issues and risks associated with the one or more projects using the globally-accessible system; and monitoring and tracking at least one of the plurality of issues and risks associated with the one or more projects through the life-cycle of at least one of the plurality of issues, at least one of the plurality of risks, or at least one of the one or more projects.

2. The method of claim 1, wherein the globally-accessible system comprises a globally-distributed computer network.

3. The method of claim 2, wherein the globally-accessible system further comprises at least one of a local area network (LAN) and a wide area network (WAN).

4. The method of claim 1, wherein the one or more projects comprise a plurality of projects.

5. The method of claim 1, further comprising storing the plurality of issues and risks associated with the one or more projects within the globally-accessible system.

6. The method of claim 1, wherein searching and identifying at least one of the plurality of issues and risks associated with the one or more projects comprises searching the one or more projects for a predetermined issue.

7. The method of claim 1, wherein searching and identifying at least one of the plurality of issues and risks associated with the one or more projects comprises searching the one or more projects for a predetermined risk.

8. The method of claim 1, wherein searching and identifying at least one of the plurality of issues and risks associated with the one or more projects comprises identifying one or more selected projects based upon a predetermined issue or risk.

9. The method of claim 1, wherein monitoring and tracking at least one of the plurality of issues and risks associated with the one or more projects comprises monitoring and tracking at least one of the plurality of risks associated with the one or more projects using a risk probability number (RPN).

10. The method of claim 1, wherein the globally-accessible system may be accessed by a plurality of remote users simultaneously.

11. A web-based method for managing the issues and risks associated with one or more projects, the method comprising:

creating a plurality of issues and risks associated with one or more projects using a globally-accessible system;

storing the plurality of issues and risks associated with the one or more projects within the globally-accessible system;

attaching meta-data to the plurality of issues and risks associated with the one or more projects;

searching and identifying at least one of the plurality of issues and risks associated with the one or more projects using the meta-data, wherein searching and identifying at least one of the plurality of issues and risks associated with the one or more projects comprises determining the existence of the at least one of the plurality of issues and risks in the context of each of the one or more projects;

monitoring and tracking at least one of the plurality of issues and risks associated with the one or more projects using the globally-accessible system; and monitoring and tracking at least one of the plurality of issues and risks associated with the one or more projects through the life-cycle of at least one of the plurality of issues, at least one of the plurality of risks, or at least one of the one or more projects.

12. The method of claim 11, wherein the globally-accessible system comprises a globally-distributed computer network.

13. The method of claim 12, wherein the globally-accessible system further comprises at least one of a local area network (LAN) and a wide area network (WAN).

14. The method of claim 11, wherein the one or more projects comprise a plurality of projects.

15. The method of claim 11, wherein searching and identifying at least one of the plurality of issues and risks associated with the one or more projects comprises searching the one or more projects for a predetermined issue.

16. The method of claim 11, wherein searching and identifying at least one of the plurality of issues and risks associated with the one or more projects comprises searching the one or more projects for a predetermined risk.

17. The method of claim 11, wherein searching and identifying at least one of the plurality of issues and risks associated with the one or more projects comprises identifying one or more selected projects based upon a predetermined issue or risk.

18. The method of claim 11, wherein monitoring and tracking at least one of the plurality of issues and risks associated with the one or more projects comprises monitoring and tracking at least one of the plurality of risks associated with the one or more projects using a risk probability number (RPN).

19. A computerized system for managing the issues and risks associated with one or more projects, the system comprising:

an issue management module operable for creating, storing, and searching a plurality of issues associated with one or more projects, wherein searching the plurality of issues associated with the one or more projects comprises determining the existence of each of the plurality of issues within the context of each of the one or more projects;

a risk management module operable for creating, storing, and searching a plurality of risks associated with the one or more projects, wherein searching the plurality of risks associated with the one or more projects comprises determining the existence of each of the plurality of risks within the context of each of the one or more projects;

a processor operable for manipulating information related to the plurality of issues and risks associated with the one or more projects; and a communications network operable for communicating the information related to the plurality of issues and risks associated with the one or more projects to and from a plurality of remote users.

20. The system of claim 19, wherein the communications network comprises a globally-distributed computer network.

21. The system of claim 20, wherein the communications network further comprises at least one of a local area network (LAN) and a wide area network (WAN).

22. The system of claim 19, wherein the one or more projects comprise a plurality of projects.

23. The system of claim 19, wherein the issue management module is operable for searching the one or more projects for a predetermined issue.

24. The system of claim 19, wherein the risk management module is operable for searching the one or more projects for a predetermined risk.

25. The system of claim 19, wherein the issue management module and the risk management module are operable for identifying one or more selected projects based upon a predetermined issue or risk.

26. The system of claim 19, wherein the issue management module is operable for monitoring and tracking at least one of the plurality of issues through the life-cycle of at least one of the one or more projects.

27. The system of claim 19, wherein the risk management module is operable for monitoring and tracking at least one of the plurality of risks through the life-cycle of at least one of the one or more projects.

28. The system of claim 19, wherein the risk management module is further operable for monitoring and tracking the plurality of risks using a risk probability number (RPN).

29. The system of claim 19, wherein the communications network is operable for communicating the information related to the plurality of issues and risks associated with the one or more projects to and from the plurality of remote users simultaneously.

30. A web-based system for managing the issues and risks associated with one or more projects, the system comprising:

an issue management module operable for creating, storing, and searching a plurality of issues associated with one or more projects, wherein searching the plurality of issues associated with the one or more projects comprises determining the existence of each of the plurality of issues within the context of each of the one or more projects;

a risk management module operable for creating, storing, and searching a plurality of risks associated with the one or more projects, wherein searching the plurality of risks associated with the one or more projects comprises determining the existence of each of the plurality of risks within the context of each of the one or more projects;

a processor operable for manipulating information related to the plurality of issues and risks associated with the one or more projects; and a communications network operable for communicating the information related to the plurality of issues and risks associated with the one or more projects to and from a plurality of remote users simultaneously.

31. The system of claim 30, wherein the communications network comprises a globally-distributed computer network.

32. The system of claim 31, wherein the communications network further comprises at least one of a local area network (LAN) and a wide area net work (WAN).

33. The system of claim 30 wherein the one or more projects comprise a plurality of projects.

34. The system of claim 30, wherein the issue management module is operable for searching the one or more projects for a predetermined issue.

35. The system of claim 30, wherein the risk management module is operable for searching the one or more projects for a predetermined risk.

36. The system of claim 30, wherein the issue management module and the risk management module are operable for identifying one or more selected projects based upon a predetermined issue or risk.

37. The system of claim 30, wherein the issue management module is operable for monitoring and tracking at least one of the plurality of issues through the life-cycle of at least one of the one or more projects.

38. The system of claim 30, wherein the risk management module is operable for monitoring and tracking at least one of the plurality of risks through the life-cycle of at least one of the one or more projects.

39. The system of claim 30, wherein the risk management module is further operable for monitoring and tracking the plurality of risks using a risk probability number (RPN).

* * * * *